United States Patent [19]
Maki

[11] 3,858,522
[45] Jan. 7, 1975

[54] LINEAR MOTOR FOR HIGH SPEED RAILROADS

[75] Inventor: Naoki Maki, Ibaraki-ken, Japan

[73] Assignee: Hitachi, Ltd., Tokyo, Japan

[22] Filed: June 11, 1973

[21] Appl. No.: 368,610

[30] Foreign Application Priority Data
June 15, 1972  Japan.............................. 47-59689

[52] U.S. Cl....... 104/148 LM, 104/148 MS, 310/12
[51] Int. Cl. .......................................... H02k 41/00
[58] Field of Search............ 104/148 MS, 148 SS, 104/148 LM; 310/12, 13

[56] References Cited
FOREIGN PATENTS OR APPLICATIONS
1,036,401   7/1966   Great Britain....................... 310/12

Primary Examiner—M. Henson Wood, Jr.
Assistant Examiner—George H. Libman
Attorney, Agent, or Firm—Craig & Antonelli

[57] ABSTRACT

In a linear motor including field coils and armature coils which act for both the levitation and propulsion of the vehicle, an additional coil is provided which co-operates with the armature for increasing the suspending force and the stabilizing force. The width of the additional coils may be less than that of the field coils making the propelling force relatively independent of the levitating force.

3 Claims, 8 Drawing Figures

LINEAR MOTOR FOR HIGH SPEED RAILROADS

This invention relates to an improvement in a linear motor for use in high speed railway transportation and more particularly to an improvement in the propelling and levitating systems and subsidiary systems such as the stabilizer for such a linear motor.

The application of a linear motor to a high speed railway vehicle which runs at a rate of 550 Km/h has been contemplated. In such an application, a super-conducting coil is provided on the vehicle while ground coils are distributed along the rail road. The vehicle is levitated by the magnetic force exerted between the super-conducting coils and the ground coils, and the levitated vehicle is then frictionlessly propelled by means of a linear motor. However, this system of transportation needs a lot of coils on the vehicle and on the ground for levitation and propulsion so that the total cost of the system becomes very high due to the provision of such a great number of coils.

Recently, a d.c. linear motor using thyristors has been proposed in which a single coil serves both to levitate and to propel the vehicle. This thyristor-equipped d.c. linear motor is very much preferable from an economical point of view. However, with this type of linear motor, it is difficult to obtain sufficient propelling force and further, the levitating force varies with the propelling force since a single coil serves both to levitate and to propel the vehicle.

The transportation system employing such a linear motor as described just above is schematically illustrated in FIG. 8 of the attached drawings, and the structure and principle of the system will be described with the aid of FIG. 8. A vehicle 1 has a longitudinal groove 4 in the center of the bottom part thereof. In the groove is located an armature coil 2 which is fixed on the ground 6 while field coils 3 are mounted on the vehicle 1 in such a manner that they lie near and on both sides of the armature coil 2.

The levitating force is created due to the mutual interaction between the flux established by the field coils 3 and the direct current flowing through those coil ends 9 of the armature coil 2 which are parallel to the direction of movement of the vehicle 1. The propelling force is produced by the magnetic flux, established by the field coils 3, acting on the direct current flowing through those coil ends of the armature coil which are perpendicular to the direction of the movement of the vehicle 1. Namely, only the armature and the field coils are used to produce both levitating and propelling forces.

Indeed, the thyristor-equipped d.c. linear motor can enjoy an advantage that the levitating force and the propelling force can be developed by the same coils, but it has an inevitable drawback that the propelling force developed cannot be so large. This is because the length of each of those coil sides to create propelling force which are perpendicular to the movement of the vehicle, must be limited to within a certain range so as to produce an appropriate levitating force.

Therefore, the most important requirement for the linear motor used in high speed railway transportation is not only that both the propelling force and the levitating force can be created by the use of a single armature, but also that the propelling force is large enough with a small variation in the levitating force. The present invention has solved this problem without complicating the structure of the system.

Accordingly, it is the object of the present invention to provide a linear motor for use in high speed railway transportation, which can serve not only as a propeller and a levitator but also as a stabilizer, which can develop substantially constant levitating and stabilizing forces, independent of variable propelling force, and in which the influence of the propelling force upon the levitating force or the stabilizing force is negligible with these forces being able to be separately controlled.

According to the present invention which has been made to attain the above said object, therefore, the propelling force can be obtained through the interaction between the current flowing through those coil sides of the armature coil (hereafter referred to as 'perpendicular coil sides') which are perpendicualr to the direction of the movement of the vehicle, and the magnetic field established by the field coils disposed near and on both sides of the perpendicular coil sides, while the levitating and stabilizing forces are created through the interaction between the current flowing through those coil sides of the armature coil (hereafter referred to as 'parallel coil sides') which are parallel to the direction of the movement of the vehicle, and the magnetic fields established by the field coils for levitation and stabilization, disposed near and on both sides of the parallel coil sides.

Now, the present invention will be described by way of embodiments and with the aid of the attached drawings, in which.

Figure 1:
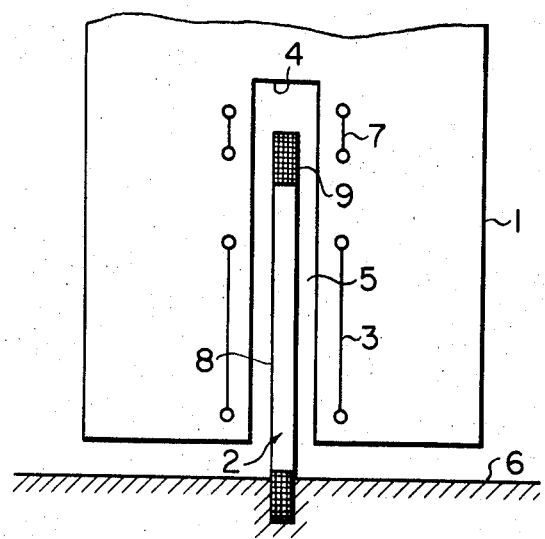
FIG. 1 is a cross section of a vehicle provided with a linear motor according to the present invention, with a specifically fitted railroad having armature coils thereon.

FIG. 1 shows in cross section a linear motor comprising a vehicle body 1, an armature coil 2 and field coils 3. The vehicle 1 has a longitudinal groove 4 in the center of the bottom portion thereof, along the direction of the movement of the vehicle 1 and the armature coil 2 is disposed in the groove 4 with a space 5 left to permit the movement of the vehicle 1 relative to the armature coil 2. The armature coil 2 is rigidly fixed on the ground 6 by a suitable reinforcing means (not shown). The field coils 3 and levitating field coils 7 are mounted on the vehicle 1.

The field coils 3 are disposed near and on both sides of the perpendicular coil sides 8 of the armature coil 2 while the levitating field coils 7 are arranged near and on both sides of the parallel coil sides 9 of the armature coil 2.

With this coil arrangement, the propelling force is obtained through the interaction between the field flux (which has only a component that links perpendicularly with the armature coil) established by the field coil 3 and the current flowing through the perpendicular coil sides 8 of the armature coil 2. And, on the other hand, the levitating force is developed due to the interaction between the magnetic flux established by the levitating field coils 7 and the current flowing through the parallel coil sides 9 of the armature coil 2.

As described above, according to the present invention, the propelling field coils and the levitating field coils are separately provided so that the propelling force can be increased by freely increasing the widths of the field coils and the armature coils, independent of the levitating force. Also, the levitating force can be increased by increasing the density of the flux established by the levitating field coils, independent of the propelling force. Moreover, in this case, the length and the relative position of each levitating field coil can be arbitrarily chosen so that the levitating force can be determined in such a manner that the undulation in levitation is minimum.

Figure 2:
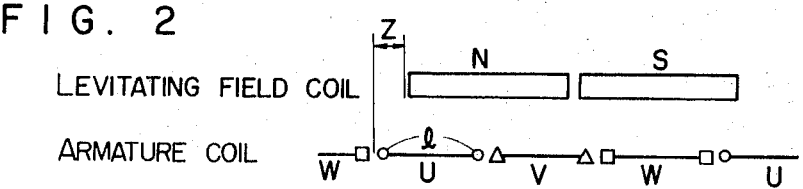
FIGS. 2 and 3 show various diagrams useful to explain the operation of the linear motor vehicle shown in FIG. 1.
Figure 2:
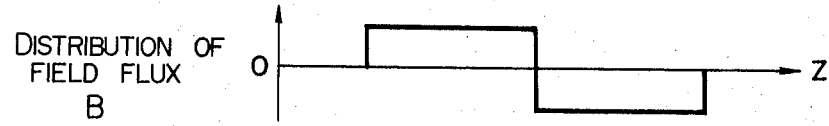
Figure 2:
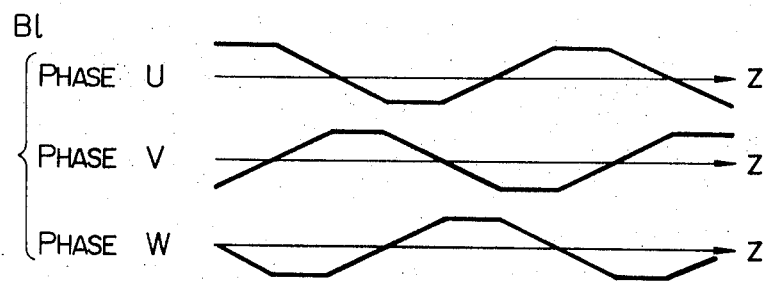
Figure 2:
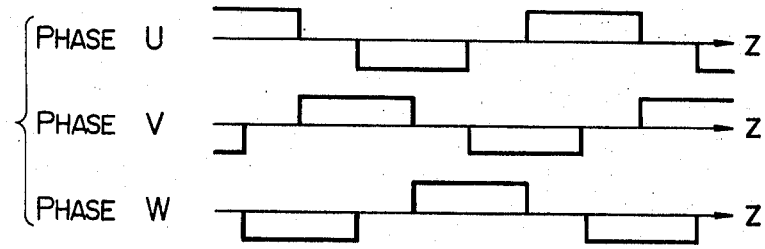
Figure 2:
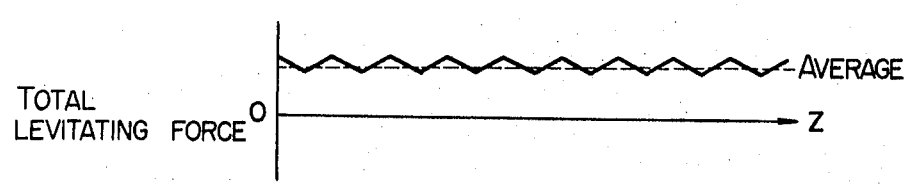
Figure 3:
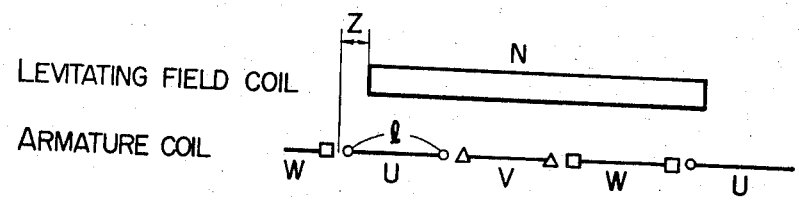
Figure 3:
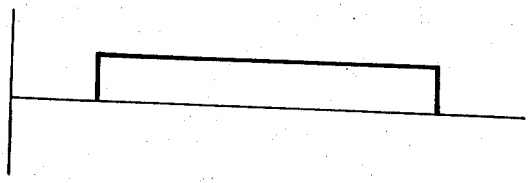
Figure 3:
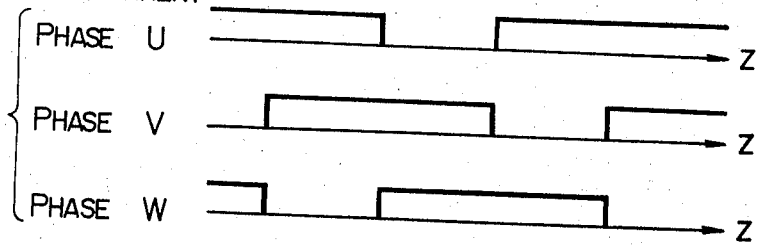
Figure 3:
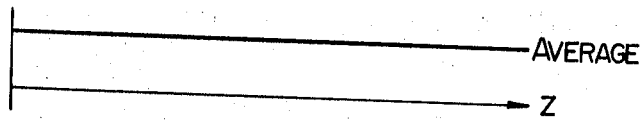

FIGS. 2 and 3 help in understanding how the levitating force is generated according to the present invention.

FIG. 2 corresponds to a case where a three-phase synchronous linear motor having a 120° coil pitch armature is used. In this case, the total levitating force is sufficiently large and the ripple component in the levitating force is small. Here, the total levitating force is the sum of the respective levitating forces corresponding to the three phases, each levitating force per one phase being given by the product of the magnetic flux B1 induced by the levitating field coils and the armature current.

FIG. 3 corresponds to a case where a half-wave excited linear motor having a 120° coil pitch armature is used, in which the length of the levitating field coil is twice as long as that of the propelling field coil. In this case, the ripple in the levitating force is negligible, as seen in FIG. 2.

Figure 4:
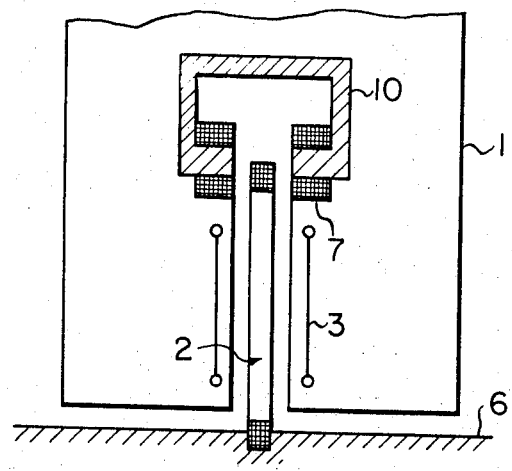
FIGS. 4 to 7 are sections, similar to that in FIG. 1, of other embodiments of the present invention.
Figure 5:
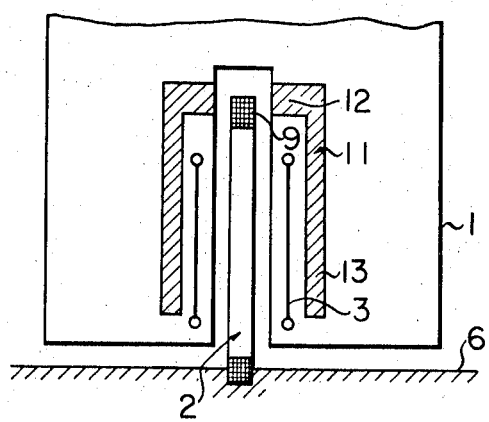

In the preceding embodiment, the levitating field coils are disposed near and on both sides of the parallel coil sides of the armature coil. As a modification of this embodiment, an iron core 10 may be provided for the levitating field coils 7, as shown in FIG. 4, so as to increase the density of the effective flux for levitation and therefore the levitating force. Moreover, as another modification, an iron core 11 may be provided to produce a levitating field, as shown in FIG. 5, which core has its top portion 12 disposed near and on both sides of the parallel coil sides 9 of the armature and its bottom portion 13 disposed near the propelling field coils 3. With this core arrangement, a part or all of the magnetic flux established by the propelling field coils 3 is guided perpendicularly to the parallel coil sides 9 so that the levitating force is produced without any special levitating field coils.

Figure 6:
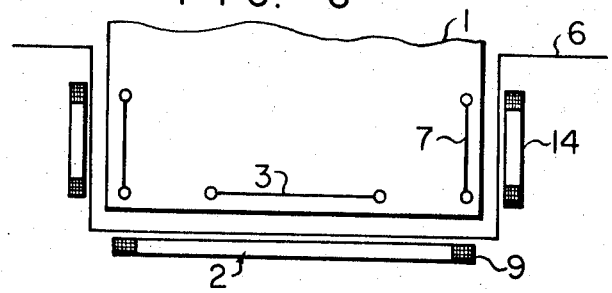

FIG. 6 shows a further embodiment of the present invention, where both the propelling field coils 3 and the armature coil 2 are horizontally disposed. In this case, too, the propelling force can be generated by means of the armature coil 2 and the field coils 3 and the levitating force is generated by the levitating field coils 7 supplying magnetic flux for the parallel coil sides 9 of the armature coil 2. Here, reference numeral 14 designates stabilizing coils. These stabilizing coils 14 may be, for example, connected with each other to form the Null Flux configuration wherein if the center of the vehicle coincides with that of the coils 14 then the flux linking the stabilizing coils 14 vanishes.

Figure 7:
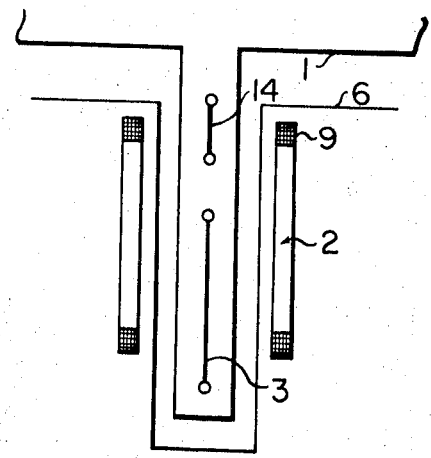
Figure 8:
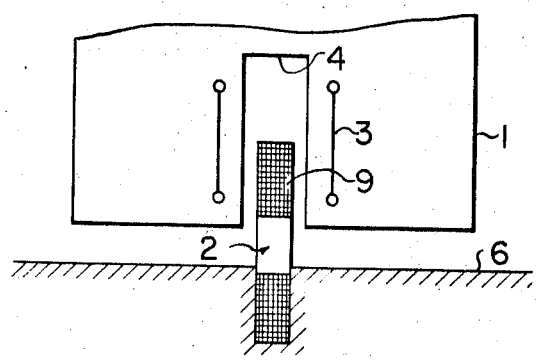
FIG. 8 is a cross section of a vehicle provided with a conventional linear motor with a cross section of the railroad having an armature coil thereon.

In the previous embodiments, the levitating force is generated by the parallel coil sides of the armature and the levitating field coils. However, in a case where a separate means for generating the levitating force or where the field coils 3 serve to generate both the levitating and the propelling forces, a stabilizing coil 14 may be provided near the parallel coil sides 9 of the armature 2, as shown in FIG. 7, to obtain a stronger stabilizing force with fewer coils.

As described above, by way of embodiments, the present invention provides a very useful linear motor for high speed railway transportation, which can always produce constant levitating and stabilizing forces independent of the variable propelling force though the motor serves to generate both the levitating and the stabilizing forces, and in which the propelling force has no influence upon the levitating force and/or the stabilizing force with the result that each force can be separately controlled.

What we claim is:

1. A linear motor for high speed railroads comprising at least one armature coil of substantially rectangular form which has a first pair of sides parallel to the direction of the movement of the vehicle and a second pair of sides perpendicular to the direction of the movement of the vehicle and at least one field coil disposed opposite to said second pair of sides of said armature coil so that a propelling force is generated by the reaction between the current flowing through said second pair of sides of the armature coil and the magnetic field produced by said field coil, characterized in that means are provided for producing a second magnetic field across at least one of said first pair of sides of said armature coil so that a levitating or stabilizing force is generated by the reaction between the current flowing through said first pair of sides of said armature coil and said second magnetic field.

2. A linear motor as defined in claim 1, characterized in that said means for producing said second magnetic field comprises at least one coil disposed substantially opposite to said first pair of sides of said armature coil.

3. A linear motor as defined in claim 1, characterized in that said means for producing said second magnetic field comprises at least one magnetic core which has a magnetic pole disposed substantially opposite to said first pair of sides of said armature coil and which is magnetized by said field coil.

* * * * *